United States Patent
Nguyen et al.

(10) Patent No.: US 10,859,706 B2
(45) Date of Patent: Dec. 8, 2020

(54) OPTICAL ELEMENT FOR AN EMITTING UNIT OF AN OPTICAL ACQUISITION DEVICE, EMITTING UNIT, OPTICAL ACQUISITION DEVICE, MOTOR VEHICLE, AND METHOD

(71) Applicant: Valeo Schalter und Sensoren GmbH, Bietigheim-Bissingen (DE)

(72) Inventors: Ho Hoai Duc Nguyen, Bietigheim-Bissingen (DE); Peter Horvath, Bietigheim-Bissingen (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 0 days.

(21) Appl. No.: 16/489,102

(22) PCT Filed: Jan. 4, 2018

(86) PCT No.: PCT/EP2018/050181
§ 371 (c)(1),
(2) Date: Aug. 27, 2019

(87) PCT Pub. No.: WO2018/157979
PCT Pub. Date: Sep. 7, 2018

(65) Prior Publication Data
US 2020/0049827 A1 Feb. 13, 2020

(30) Foreign Application Priority Data
Feb. 28, 2017 (DE) .................. 10 2017 104 104

(51) Int. Cl.
*G01S 17/931* (2020.01)
*G02B 26/10* (2006.01)
(Continued)

(52) U.S. Cl.
CPC ............ *G01S 17/931* (2020.01); *G02B 26/10* (2013.01); *G01S 7/484* (2013.01); *G01S 7/486* (2013.01)

(58) Field of Classification Search
CPC ........ G01S 17/931; G01S 7/484; G01S 7/486; G02B 26/10
See application file for complete search history.

(56) References Cited

U.S. PATENT DOCUMENTS

| 5,982,523 | A | 11/1999 | Shimada et al. |
| 6,900,917 | B2 * | 5/2005 | Kim ...................... G02B 17/08 |
| | | | 359/207.1 |

(Continued)

FOREIGN PATENT DOCUMENTS

| DE | 9010222 U1 | 8/1991 |
| DE | 202006015092 U1 | 12/2006 |

(Continued)

OTHER PUBLICATIONS

International Search Report and Written Opinion in corresponding International Application PCT/EP2018/050181, dated May 25, 2018 (15 pages).

(Continued)

*Primary Examiner* — Maria E Vazquez Colon
(74) *Attorney, Agent, or Firm* — Osha Bergman Watanabe & Burton LLP

(57) ABSTRACT

The invention relates to an optical element (13) for an emitting unit (8) of an optical acquisition device (3), wherein the optical element (13) comprises a first side (13*a*) having a reflective first free-form surface (F1) and a second side (13*b*), which is opposite to the first side (13*a*), having a refractive second free-form surface (F2). Furthermore, the optical element (13) is designed to transmit a beam bundle (10) incident on the second side (13*b*) on the optical element (13) at least in large part through the second free-form (Continued)

surface (F2) up to the first free-form surface (F1), to reflect the beam bundle (10) transmitted through the second free-form surface (F2) up to the first free-form surface (F1) at the first free-form surface (F1), and to emit the beam bundle (10) reflected from the first free-form surface (F1) via the second free-form surface (F2). In this case, the first free-form surface (F1) is designed to increase a divergence of the beam bundle (10) incident on the first free-form surface (F1), and the second free-form surface (F2) is designed, upon emission of the beam bundle (10) reflected from the first free-form surface (F1), to reduce the divergence increased during the reflection.

13 Claims, 5 Drawing Sheets

(51) Int. Cl.
  *G01S 7/484* (2006.01)
  *G01S 7/486* (2020.01)

(56) References Cited

U.S. PATENT DOCUMENTS

| | | |
|---|---|---|
| 2003/0184834 A1 | 10/2003 | Inagaki |
| 2003/0227660 A1 | 12/2003 | Kim |
| 2006/0114575 A1* | 6/2006 | Togino .................. G02B 13/06 359/725 |
| 2015/0252979 A1* | 9/2015 | Bailey .................. F21V 7/0091 362/231 |
| 2018/0003978 A1* | 1/2018 | Benitez .................. G02B 27/01 |

FOREIGN PATENT DOCUMENTS

| | | |
|---|---|---|
| DE | 102006055743 A1 | 5/2008 |
| DE | 102008064652 A1 | 3/2011 |
| DE | 102011053975 A1 | 4/2012 |
| JP | 2003287695 A | 10/2003 |
| WO | 2010/136236 A1 | 12/2010 |
| WO | 2016/173954 A1 | 11/2016 |

OTHER PUBLICATIONS

German Search Report in corresponding German Application No. 10 2017 104 104.4, dated Nov. 16, 2017 (6 pages).
The Notice of Reason for Rejection issued in corresponding Japanese Application No. 2019-546810, dated Sep. 4, 2020 (11 pages).

* cited by examiner

OPTICAL ELEMENT FOR AN EMITTING UNIT OF AN OPTICAL ACQUISITION DEVICE, EMITTING UNIT, OPTICAL ACQUISITION DEVICE, MOTOR VEHICLE, AND METHOD

The invention relates to an optical element for an emitting unit of an optical acquisition device for a motor vehicle, an emitting unit of an optical acquisition device, an optical acquisition device for a motor vehicle, a motor vehicle, and a method for producing an optical element.

Interest is directed in the present case to optical elements, in particular those which are also used in emitting units of optical acquisition devices, in particular laser scanners. A variety of optical elements are known in this case from the prior art, for example, lenses, mirrors and/or reflectors, prisms, or the like. Such optical elements are typically also part of optical acquisition devices, such as laser scanners. With regard to such an optical acquisition device, monitoring a surrounding region of the motor vehicle by means of the optical acquisition device is known. Objects can be detected in the surrounding region of the motor vehicle and items of information about the acquired objects, for example, a relative location of the objects in relation to the motor vehicle, can be provided to a driver assistance system of the motor vehicle by the acquisition device. The driver assistance system can, for example, initiate measures to avoid a collision of the motor vehicle with the object based on these items of information, for example, automatically decelerate the motor vehicle before the collision.

In laser scanners according to the prior art, typically a light beam or beam bundle is emitted into the surrounding region by an emitting unit of the laser scanner and the surrounding region is scanned by changing a scanning angle up to a scanning direction. As soon as the light beam is incident on an object in the surrounding region, at least a part of the light beam is reflected at the object back to the laser scanner. A receiving unit of the laser scanner receives the reflected part of the light beam and determines a distance of the object from the motor vehicle on the basis of a runtime of the light beam or a duration between the emission of the light beam and the reception of the reflected part of the light beam. In addition, an orientation or a direction of the object in relation to the motor vehicle can be determined if the scanning angle is known upon the emission of the light beam. The relative location of the object in relation to the motor vehicle can then be determined from the orientation and the distance.

To change the scanning angle, the light beam or the beam bundle is typically deflected by a deflection unit of the emitting unit. The deflection unit is generally designed in this case as a rotatable and/or pivotable mirror, which reflects the light beam along the different scanning directions, wherein the scanning direction is set via a pivot angle and/or an orientation of the pivotable mirror. A surrounding region, within which the light beam is deflectable, forms a field of view of the emitting unit in this case. To achieve the largest possible field of view in this case in the horizontal, in particular with limited dimensioning of the pivotable mirror, such a mirror is typically inclined at a predetermined fixed angle in relation to the main incident beam direction of the laser beam bundle, which results in an undesired distortion of the field of view, however. For example, if a line which is to extend vertically, i.e., parallel to the vehicle vertical axis, is to be provided for the scanning, however, this described distortion thus has the result that such scanning lines are inclined in relation to the vertical and as a function of the scanning angle. In particular, this inclination is all the greater the greater the scanning angle is. Observed over multiple scanning time steps, a plurality of scanning lines extending in parallel in the vertical direction thus does not result, but rather a scanning line image having fan-shaped structure, because of which this distortion effect is also referred to as the smiley effect or banana effect. Optical compensation measures, for example, specially shaped correction mirrors, would have the significant disadvantage, however, that because of the curvature thereof required for the compensation, they would unavoidably result in a strong divergence of the beam bundle, which is accompanied by a very low Q factor. This is defined as the ratio of frequency and half-width value or FWHM (full width at half maximum). A degradation of the quality of the beam bundle thus results therefrom, which in turn has a negative effect on the measurement accuracy. In addition, the problem also accompanies this that in particular in applications in the automotive field, the installation space available for sensors is very limited, so that complex optical systems are not implementable for space reasons.

The object of the present invention is therefore to specify an optical element for an emitting unit of an optical acquisition device, an emitting unit, an optical acquisition device, a motor vehicle, and a method for producing an optical element, by means of which at least an improvement may be enabled with respect to the above-described problems.

This object is achieved by an optical element, an emitting unit, an optical acquisition device, a motor vehicle, and a method having the features according to the respective independent claims. Advantageous embodiments of the invention are the subject matter of the dependent patent claims, the description, and the figures.

An optical element according to the invention for an emitting unit of an optical acquisition device comprises in this case a first side having a reflective first free-form surface and a second side, opposite to the first side, having a refractive second free-form surface. Furthermore, the optical element is designed to transmit a beam bundle incident on the second side on the optical element at least in large part through the second free-form surface up to the first free-form surface, to reflect the beam bundle transmitted through the second free-form surface up to the first free-form surface on the first free-form surface, and to emit the beam bundle reflected from the first free-form surface via the second free-form surface. Furthermore, the first free-form surface is designed to increase a divergence of the beam bundle incident on the first free-form surface, and the second free-form surface is designed to reduce the divergence increased during the reflection upon emission of the beam bundle reflected from the first free-form surface.

The optical element according to the invention thus advantageously comprises both a reflective, i.e., mirrored free-form surface and also a refractive free-form surface, which can now advantageously be optimized with respect to achieving different effects because of the free form thereof. In this way, it is advantageously made possible to compensate for distortions, such as the above-described banana effect, for example, by way of the reflected free-form surface, without having to accept the disadvantages of a reduced beam quality, since the beam divergence or beam bundle divergence, which increases during the reflection on the reflected free-form surface, may now advantageously be compensated for or at least reduced by the second free-form surface. In this way, a targeted deformation of a light distribution in a desired manner may thus advantageously be achieved simultaneously without increasing beam bundle divergence and without reduced Q factor. Since these functions are provided by a single optical element, which has both reflective and also refractive properties, the expenditure for correct positioning of these two optically active surfaces in relation to one another is moreover also omitted. In addition, in this way an enormous amount of installation space can also be saved, which is particularly advantageous upon the use of this optical element in systems or units having limited installation space in particular, as is the case, for example, in laser scanners. Moreover, by providing a single optical element, which comprises both reflective properties and also refractive properties, the light losses are significantly less than if these properties were implemented by separate optical elements, for example, a mirror and a lens separate therefrom. Although the optical element is also particularly suitable for emitting units of optical acquisition devices, such as laser scanners, no limits are advantageously placed on the areas of use of these optical elements, however. In particular, this optical element according to the invention and its embodiments can be used in any arbitrary optical system in which a desired equalization or change of a given light distribution is to be achieved without reduction of the beam quality due to increasing divergence and reduced Q factor.

A divergence of a beam bundle is to be understood in this case as an increase of the half-width value (FWHM) in the propagation direction of the light, which is typically specified using an angle, which describes the aperture angle of the diverging beam bundle.

In one particularly advantageous embodiment of the invention, the optical element is designed to image a first light distribution, which can be incident in particular over multiple time steps, on the second free-form surface of the optical element in at least one incidence direction, and which can be incident in its entirety, in particular also over the multiple time steps, in a first plane perpendicular to the at least one incidence direction on the optical element, and which is delimited by two nonparallel first straight lines, on a light distribution providing a field of view, which light distribution is delimited in a second plane perpendicular to at least one defined emission direction by two parallel second straight lines.

In other words, the optical element is thus designed to image a light distribution incident on the optical element, which comprises, for example, a line structure having multiple lines spaced apart from one another, in which the lines enclose an angle of greater or lesser size with one another, however, on a light distribution having a line structure in which all lines extend parallel to one another. Over multiple time steps is preferably to be understood in this case to mean that during the application of this optical element in a laser scanner, typically those individual lines which are provided by a beam bundle extended in one direction are incident on the optical element not simultaneously but rather in a chronological sequence of multiple successive time steps and are emitted thereby and imaged in the described manner.

The first and second plane refer in this case in general to section planes which do not extend parallel to the incidence directions or emission direction, respectively.

In this way, the so-called banana effect may advantageously be compensated for. This described compensation is preferably effectuated in this case primarily by a corresponding design of the reflective first free-form surface of the optical element. However, a further residual compensation can advantageously also be additionally assumed by the reflective second free-form surface. This is in turn very particularly advantageous in particular if the installation space in which the optical element is to be arranged is very limited. This is again the case, for example, if the optical element is used in a laser scanner for a motor vehicle. Because of the restricted sensor size, the dimensions for the optical element are also limited in particular in the horizontal direction with respect to the intended installation position in the motor vehicle. For example, if only one free-form mirror were used to compensate for the banana effect, a complete compensation of the banana effect thus would not be possible for typical laser scanners because of the limited dimensions of such a free-form mirror in the horizontal direction. Experiments using only one free-form mirror to compensate for the banana effect have had the result that in the case of the dimensions typically available in a laser scanner for such a compensation mirror, a deviation of at least 1° from the vertical still results at an emission angle or scanning angle of 35°. The banana effect thus cannot be completely compensated for using only one free-form mirror. The optical element according to the invention and its embodiments, in contrast, advantageously enable, due to the two different and combined active surfaces, a significantly better compensation of the banana effect with smaller design in addition, since this compensation is carried out not only by a corresponding design of the reflective first free-form surface, but rather can additionally also be assisted by a corresponding design of the second receiving free-form surface, which is refractive.

Furthermore, not only can a reduction of the beam or beam bundle divergence advantageously be achieved by the refractive free-form surface, but rather additionally also a homogenization with respect to various scanning angles or emission angles. In the case of a compensation of the banana effect by, for example, only one free-form mirror, not only would a greater beam bundle divergence of a respective emission beam bundle occur, this would additionally also be inhomogeneous and would result more strongly the larger the emission angles are. By way of the provision according to the invention of an additional refractive second free-form surface, it advantageously becomes possible that the beam bundle divergence can be reduced to a minimum independently of the emission angle. Particularly great advantages may thus be achieved above all at very large emission angles, which is especially relevant in particular if the largest possible field of view is to be provided in a specific direction, for example, in the horizontal direction with respect to an intended installation position in the motor vehicle.

The optical element therefore preferably comprises a central region of the refractive free-form surface and the refractive free-form surface is furthermore formed in such a way that the divergence of the beam bundle exiting through the second free-form surface in a light exit region is reduced more strongly the greater the distance of the light exit region is with respect to a predetermined first direction from the central region. In this way, the above-described homogenization of the divergence may be provided in a particularly advantageous and simple manner. Moreover, it can furthermore be provided that the refractive free-form surface is designed in such a way that a beam bundle exiting in a light exit region is reduced uniformly strongly independently of the distance of the light exit region with respect to a second direction, which is perpendicular to the first direction, from the central region.

Furthermore, it is preferable that the optical element is designed in such a way that the above-described function of the reduction of the divergence and the compensation of the banana effect by the optical element is implementable with respect to a light distribution incident on the optical element, which can be provided by one or more beam bundles, which is not collimated, but rather diverges, and in particular originates from a common emission region, which is smaller than the area of the optical element illuminated by the beam bundle. In this way, the optical element is particularly well adapted to the conditions in a laser scanner.

In a further advantageous embodiment of the invention, the optical element is designed, upon emission of the beam bundle reflected from the first free-form surface, to reduce the divergence of the beam bundle increased during the reflection in such a manner that the emitted beam bundle has a divergence less than 0.2°. This preferably applies for all emission angles in an emission angle range of up to 150°, or from −75° to +75°. In particular, a divergence of only 0.1° may even be achieved by the optical element. In this case, experiments in which only one free-form mirror was used for the correction of the banana effect have had the result that the divergence of the beam bundle at a scanning angle of 0° is already at least 0.2°, while at a scanning angle of 35°, a divergence of the beam bundle of 1.2° is to be noted. It can be clearly seen from this that in particular with regard to the beam quality, significant advantages can be achieved both with respect to the reduction of the divergence and also with respect to its homogenization over a large emission angle range by the optical element, which combines a reflective and a refractive free-form surface.

In a further advantageous embodiment of the invention, the optical element is designed as a free-form lens having a reflective coating on one side of the free-form lens to provide the first reflective free-form surface of the optical element. A particularly simple provision of the optical element is enabled in this way. In particular, such a free-form lens can be provided in a particularly simple manner by an injection-moulding method, which will be described in greater detail hereafter, which enables particularly cost-effective production of the optical element. Moreover, problems which can result in the case of separate optical elements due to different coefficients of thermal expansion can be avoided by the coating to produce the reflective free-form surface. Adaptations between different materials and material properties are thus advantageously also not necessary, as would be the case if separate optical elements had to be adapted to one another.

The reflective coating preferably comprises a metallic material, since such metallic materials are particularly well suited for providing the reflective properties. In principle, any arbitrary metallic material comes into consideration for this purpose. Examples of this are gold, silver, aluminium, and/or copper. Arbitrarily designed alloys also come into consideration as the coating. Silver is distinguished in this case over all others by its particularly high reflectivity.

The free-form lens preferably comprises a glass and/or a plastic. In principle, any arbitrary transparent material also comes into consideration for the free-form lens. Typical plastics are, for example, PMMA (polymethylmethacrylate) or PC (polycarbonate). Glass is distinguished in relation to plastics in this case by its particularly high hardness and scratch resistance, while plastics have the great advantage in relation to glass that they are significantly lighter.

Furthermore, the invention also relates to an emitting unit for an optical acquisition device of a motor vehicle, wherein the emitting unit comprises an optical element according to the invention or one of its embodiments. The features, combinations of features, and the advantages thereof described for the optical element according to the invention and its embodiments apply similarly in this case to the emitting unit according to the invention.

The emitting unit preferably comprises a light source for providing at least one beam bundle. The light source can also comprise multiple individual light sources, for example. For example, the light source comprises at least one laser diode, preferably also multiple laser diodes, for example, a laser diode array. Moreover, the emitting unit preferably comprises a deflection unit, which is designed to deflect the at least one beam bundle in successive time steps in different predetermined incidence directions and to radiate it onto the second free-form surface of the optical element. In this case, a respective incidence direction corresponds to a respective emission direction, in which the beam bundle radiated onto the second free-form surface of the optical element is emitted from the second free-form surface of the optical element after reflection on the first free-form surface of the optical element. Depending on the present incidence direction of the incident radiation of the beam bundle on the optical element, this beam bundle is thus advantageously emitted in a specific emission direction or in a respective emission range, respectively. A predetermined surrounding region, in particular the field of view of the emitting unit, can thus advantageously be scanned by variation, in particular chronological variation of the incidence directions.

In a further advantageous embodiment of the invention, the deflection unit comprises a mirror having a mirror plane. The mirror preferably represents a MEMS (micro-electro-mechanical system) mirror in this case. Furthermore, the emitting unit is preferably configured in such a manner that the at least one light bundle provided by the light source can be radiated onto the mirror plane in a main incidence direction, wherein the mirror is arranged in such a manner that the mirror plane is inclined in relation to the main incidence direction by a fixed first angle around a first axis perpendicular to the main incidence direction and is pivotable by various predetermined second angles around a second axis perpendicular to the first axis, in particular wherein the first and the second axis extend in the mirror plane. By pivoting the mirror around the second axis or by setting the mirror in respective time steps at different second angles, a deflection of the incident beam bundle in the different incidence directions onto the optical element can advantageously be provided.

A particularly large field of view in at least one direction, in particular in the horizontal direction with respect to the intended installation position in a motor vehicle, can advantageously be provided by the additional inclination of the mirror by the fixed first angle. This fixed angle simultaneously causes, however, the described banana effect, because of which in particular the use of the optical element according to the invention or one of its embodiments in this arrangement is particularly advantageous. A particularly large field of view may thus be provided undistorted and with very high beam quality at the same time by this arrangement. The fixed first angle is defined in this case, for example, as an angle between the main incidence direction and the mirror plane, and is between 0 and 90°, preferably between 10 and 80°, for example, 57°. The smaller this angle is, or the larger the angle is between the surface normals of the mirror plane and the main incidence direction, the greater the banana effect is also. A field of view may preferably be provided by this arrangement which comprises an aperture angle of at least 100°, in particular preferably at least 150° in at least one direction. Furthermore, it is preferable for the field of view to have an aperture angle of at least 10°, in particular at least 20°, for example, 26°, in a direction perpendicular thereto, for example, in the vertical direction.

In a further advantageous embodiment of the invention, an incidence direction range is associated with a respective second angle, wherein the incidence directions of a first of the incidence direction ranges differ from the incidence directions of a second of the incidence direction ranges, which is different from the first, in a third angle, which is twice as large as the difference between the second angles associated with the first and second incidence direction ranges.

In this way, not only scanning points but rather scanning lines, which are vertically oriented with respect to the intended installation position in the motor vehicle, for example, may advantageously be provided in individual time steps. The beam bundle reflected by the mirror and incident on the optical element in a respective time step is thus expanded in one direction to a certain extent and thus comprises not only one single incidence direction but rather multiple incidence directions which are located in one plane. Thus, an incidence plane is more or less provided in a respective time step, which also has a certain, but very small thickness in real systems. The incidence planes provided in a respective time step thus differ in the described third angle. Thus, for example, if the orientation of the mirror plane is changed by an angle of 2° between two time steps, the respective resulting incidence planes thus differ by an angle of 4°, i.e., twice the angle.

In a further advantageous embodiment of the invention, the emitting unit is configured in such a manner that the optical element is irradiated for a respective set second angle of the mirror using a light distribution, in particular observed in a plane of section, for example, perpendicularly to the one incidence direction or incidence plane, which has a maximum extension in a respective first direction which defines a length multiple times greater than a width of the light distribution perpendicular to the length. Corresponding beam-forming elements can be provided to provide such a light distribution. For example, the beam bundle provided by the light source can be reduced by an FAC (fast axis collimating) lens in one extension direction to a minimal width, while the light bundle is not reduced or is reduced significantly less in its extension in a direction perpendicular thereto. Accordingly, beam bundles, which have a length in cross section which is significantly greater, in particular greater by orders of magnitude, than the widths thereof, are then radiated in respective time steps via the pivotable mirror onto the optical element.

Because of the fixed first angle by which the mirror is inclined in relation to the main incidence direction, however, the respective first directions, i.e., which the longitudinal extension of the respective beam bundles in cross section describe in a respective time step, for a respective set second angle of the mirror, resultingly enclose a fourth angle with one another which is different from zero. The light strips incident on the optical element in respective time steps are thus not parallel to one another, but rather enclose respective fourth angles with one another. The inclination of these longitudinally-extended light strips with respect to a reference direction, for example, with respect to the extension of the light strip which results at a second angle of the mirror of 0°, is greater in this case the greater the present deflection angle is, i.e., the second angle of the mirror.

This in turn describes the banana effect caused by the fixed first angle of the mirror, which is advantageously compensated for by the optical element. It is accordingly particularly advantageous that the optical element is designed to image the light distribution radiated onto the optical element for a respective set second angle of the mirror on a respective emitted light distribution, which has a maximum extension in a respective second direction which defines a length which is again multiple times greater than a width of the respective emitted light distribution perpendicular to the length, wherein the second directions are each parallel to one another. In other words, the light strips or light lines, which are incident on the optical element in a chronological sequence and are not parallel to one another, can thus be imaged on light strips or light lines or scanning lines, respectively, parallel to one another.

Furthermore, the invention also relates to an optical acquisition device for a motor vehicle, for example, a laser scanner, wherein the optical acquisition device comprises an emitting unit according to the invention or one of its embodiments. In addition, the optical acquisition device can also comprise a suitable receiving unit for detecting the reflected parts of the emitted scanning beams or scanning lines, respectively, which are reflected from objects.

Furthermore, the invention also relates to a motor vehicle having an optical acquisition device according to the invention or one of its embodiments.

The features, combinations of features, and the advantages thereof mentioned for the emitting unit according to the invention and its embodiments apply similarly to the optical acquisition device according to the invention. The optical acquisition device is preferably designed as a laser scanner.

Furthermore, the invention also relates to a method for producing an optical element, in particular an optical element according to the invention or one of its embodiments. According to this method, a molten material is poured into an injection mould, which comprises a cavity. Furthermore, in this case the cavity comprises a first side having a first predetermined free-form surface, which corresponds to the first free-form surface of the optical element, and a second side having a second predetermined free-form surface, which corresponds to the second free-form surface of the optical element. Moreover, the first side of the cavity is opposite to the second side of the cavity at least in the state of the injection mould filled with the material. Furthermore, the material is subsequently transferred into the solid state, wherein the material is transparent at least in the solid state. The material removed from the injection mould and forming a free-form lens is then coated using a reflective coating on a predetermined free-form surface of the material formed by the first side of the cavity.

The optical element according to the invention and any of its embodiments may be produced in a particularly simple and cost-effective manner by this method.

Further features of the invention result from the claims, the figures, and the description of the figures. The features and combinations of features mentioned above in the description, and also the features and combinations of features mentioned hereafter in the description of figures and/or solely shown in the figures are usable not only in the respective specified combination, but rather also in other combinations or alone, without leaving the scope of the invention. Embodiments are thus also to be considered to be comprised and disclosed by the invention which are not explicitly shown and explained in the figures, but originate and can be produced from the explained embodiments by separate combinations of features. Embodiments and combinations of features are also to be considered to be disclosed which do not comprise all features of an originally formulated independent claim. In addition, embodiments and combinations of features are to be considered to be disclosed, in particular by the above-described embodiments, which go beyond or deviate from the combinations of features represented in the references of the claims.

In the figures.

In the figures, identical and functionally-identical elements are provided with identical reference signs. The coordinate systems shown in the figures are also to be considered to be the same coordinate system.

Figure 1:
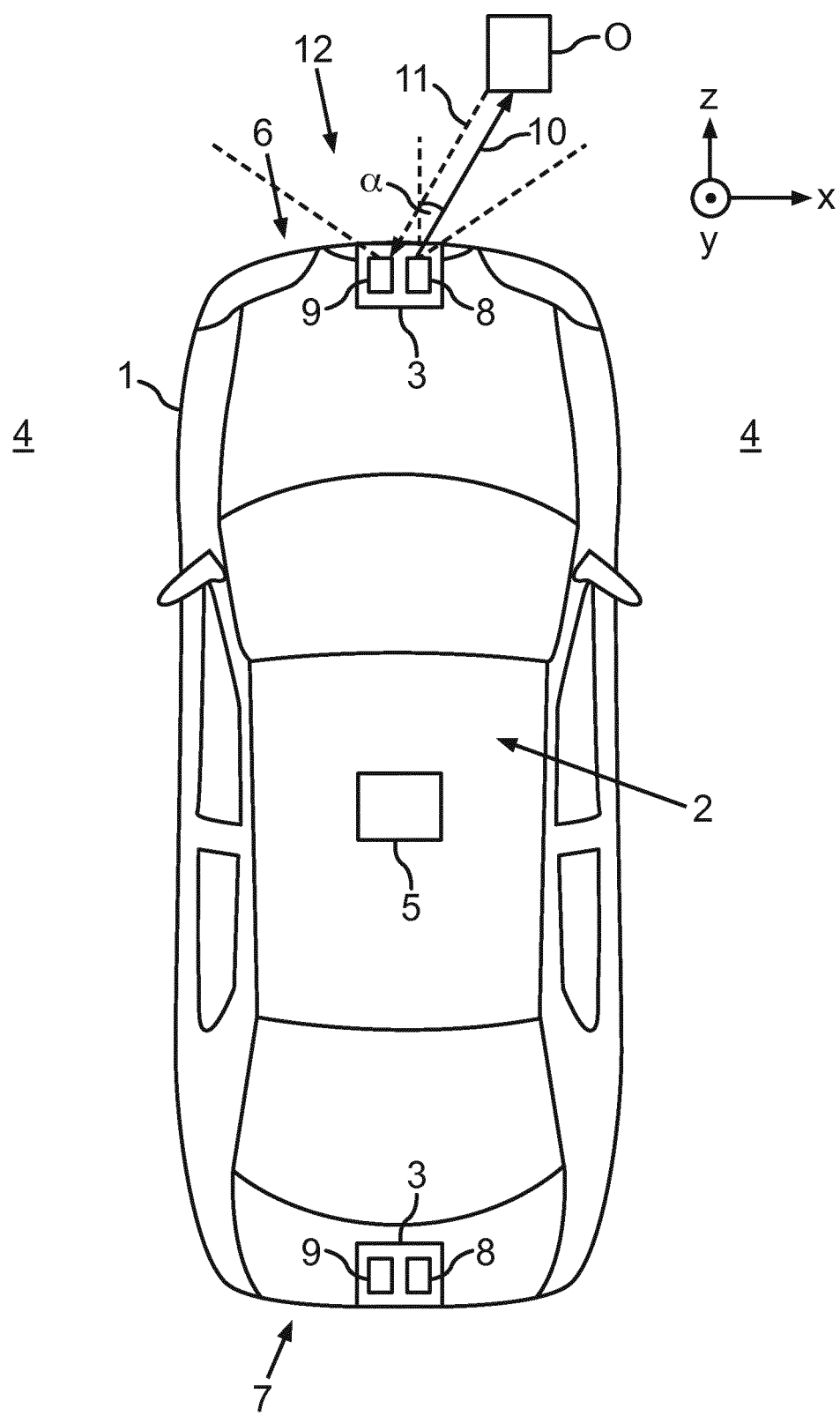
FIG. 1 shows a schematic illustration of an embodiment of a motor vehicle according to the invention.

FIG. 1 shows a motor vehicle 1 according to one exemplary embodiment of the invention. In the present case, the motor vehicle 1 is designed as a passenger vehicle. The motor vehicle 1 comprises a driver assistance system 2, which is designed to assist a driver of the motor vehicle 1 when driving the motor vehicle 1. The driver assistance system 2 comprises at least one optical acquisition device 3, which is designed to monitor a surrounding region 4 of the motor vehicle 1. In particular, a distance and an orientation of an object O in the surrounding region 4 of the motor vehicle 1 can be acquired by means of the acquisition device 3 and provided, for example, to a control unit 5 of the driver assistance system 2. The control unit 5 can automatically decelerate the motor vehicle 1 for collision avoidance, for example, if the distance of the object O falls below a predetermined threshold value. In the present case, the driver assistance system 2 comprises two acquisition devices 3, wherein a first acquisition device 3 is arranged in a front region 6 of the motor vehicle 1 and is designed to monitor the surrounding region 4 in front of the motor vehicle 1, and a second acquisition device 3 is arranged in a rear region 7 of the motor vehicle 1 and is used to monitor the surrounding region 4 behind the motor vehicle 1. Further acquisition devices 3 can also be provided, for example, in lateral regions of the motor vehicle 1.

The optical acquisition device 3 is designed in the present case as a laser scanner and comprises an emitting unit 8 and a receiving unit 9. The emitting unit 8 emits a light beam bundle 10 into the surrounding region 4 and the receiving unit 9 receives a part 11 of the light beam bundle 10 reflected at the object O. The receiving unit 9 can acquire the distance of the object O on the basis of a runtime between the emission of the light beam bundle 10 and the reception of the reflected part 11 of the light beam bundle 10. The light beam bundle 10 is oriented in this case successively and/or step-by-step along various scanning angles α. The surrounding region 4 is thus scanned in a grid by means of the light beam bundle 10. According to FIG. 1, horizontal components of the scanning angle α are shown in a horizontal plane spanned by a vehicle longitudinal direction and a vehicle transverse direction. The horizontal component of the scanning angle α and a vertical component (not shown here) of the scanning angle α in a plane spanned by the vehicle longitudinal direction and a vehicle vertical direction are known to the emitting unit 8, whereby an orientation and/or direction of the object O in relation to the motor vehicle 1 is also known. An angle range 12 in the surrounding region 4, which is illuminated by means of the light beam bundle 10 oriented in different scanning directions, forms a field of view of the emitting unit 8, at least in the horizontal shown here. In this case, for example, a field of view having an aperture angle or angle range 12 of 150° may be provided in the horizontal. The aperture angle of the field of view in the vertical, i.e., in the y-z plane, can be, for example, between 20° and 30°, for example, 26°.

Figure 2:
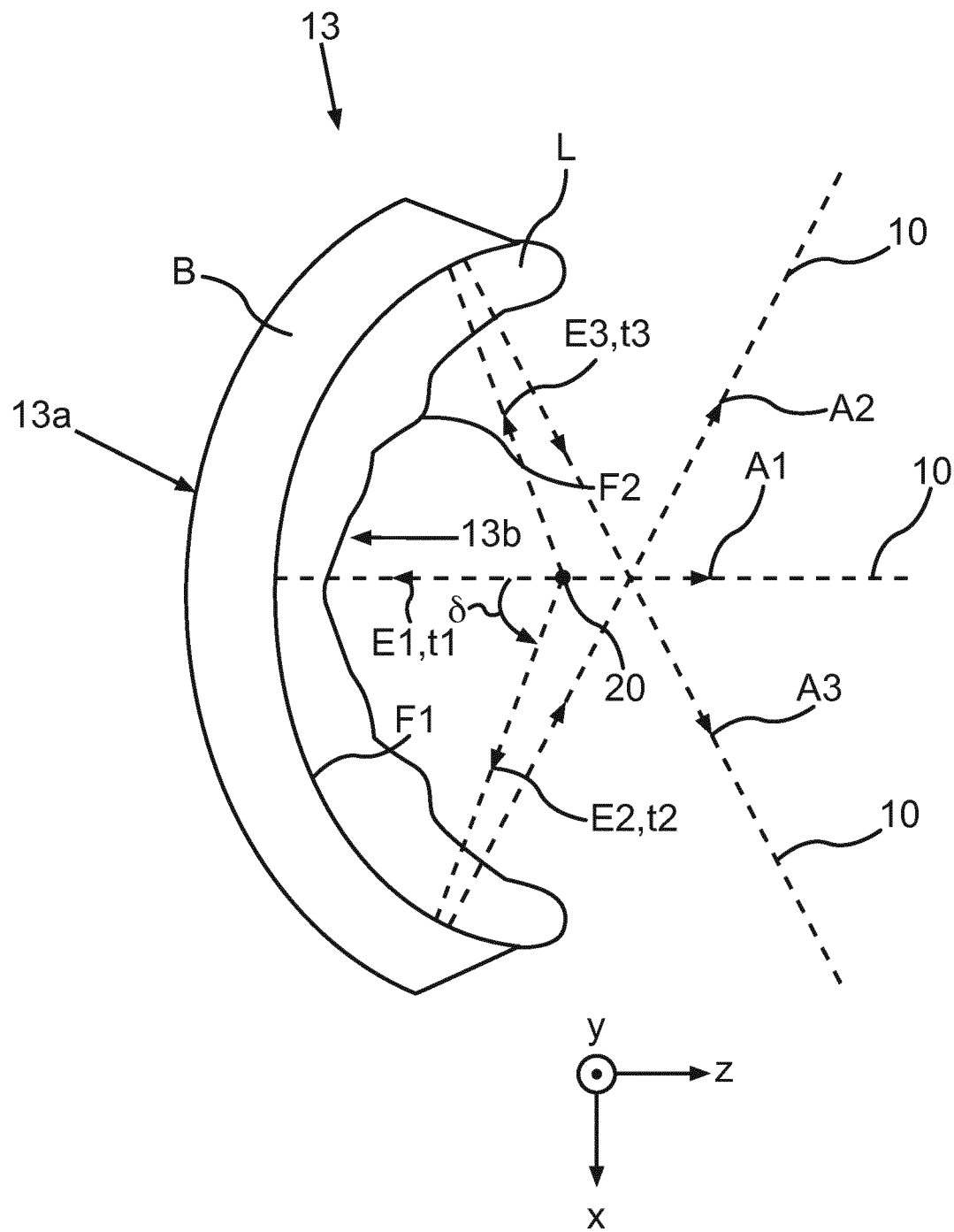
FIG. 2 shows a schematic illustration of an optical element according to one exemplary embodiment of the invention.

FIG. 2 shows a schematic illustration of an optical element 13 for an emitting unit 8 of an optical acquisition device 3 according to one exemplary embodiment of the invention. The optical element 13 comprises a first side 13a having a reflective, mirrored, and nontransparent free-form surface F1 and a second side 13b, which is opposite to the first side 13a, having a transparent and refractive second free-form surface F2. The optical element 13 can be provided, for example, as a free-form lens L, which is coated on one side using a coating B to provide the mirrored free-form surface F1. The free-form lens L can be formed in this case from any arbitrary transparent material, for example, glass or plastic. The mirrored and/or reflective coating B preferably comprises a metallic material or a metallic material combination or alloy. The two free-form surfaces F1, F2 can be formed concave, convex, curved, faceted, smooth, spherical, aspherical, or in arbitrary combinations thereof in this case. The optical element 13 is schematically shown in this example in FIG. 2 in a top view, i.e., in the x-z plane.

Light beam bundles 10 incident on the optical element 13, which are incident on the second side 13b of the optical element 13, are transmitted in large part through the second free-form surface F2, reflected from the reflective free-form surface F1, and emitted again via the second free-form surface F2. The different incidence directions E1, E2, E3 correspond in this case to respective emission directions A1, A2, A3, in which the light beam bundles are emitted from the optical element 13. If the optical element 13 is used in an optical acquisition device 3, for example, a laser scanner, preferably individual light beam bundles 10 are incident in a chronological sequence in succession on the optical element 13. In the example shown in FIG. 2, by way of example, a first light beam bundle 10 is incident in a first incidence direction E1 at a first point in time t1, a second light beam bundle 10 is incident in a second incidence direction E2 at a second point in time t2, and a third light beam bundle 10 is incident in a third incidence direction E3 at a third point in time t3. These different incidence directions E1, E2, E3 can be provided, for example, by a pivotable mirror 20, which is described in greater detail hereafter. Furthermore, only three different incidence directions E1, E2, E3 are shown in this case for reasons of comprehensibility, however, manifold further incidence directions and corresponding emission directions can also be provided in the same manner by an emitting unit 8.

The optical element 13 is advantageously designed to image a light distribution incident on the second side 13b of the optical element 13 on an emitted light distribution, which is formed and/or equalized in a predetermined manner. Thus, for example, if an incident light distribution comprises undesired distortion effects, these undesired effects can thus advantageously be compensated for by the optical element 13. To provide such an equalization, which is preferably effectuated at least in large part by the reflective free-form surface F1, curved surface regions or surface regions inclined differently in relation to one another unavoidably have to be provided, which in turn result in a strong divergence of the reflected light bundles. These divergences arising due to reflections on the reflective free-form surface F1 can advantageously be reduced by the second free-form surface F2, and also additionally homogenized. It is thus possible to effectuate emitting a desired light distribution having particularly high beam quality in a manner particularly efficient for installation space by way of the optical element 13, which in turn is favourable for the measurement accuracy.

Figure 3:
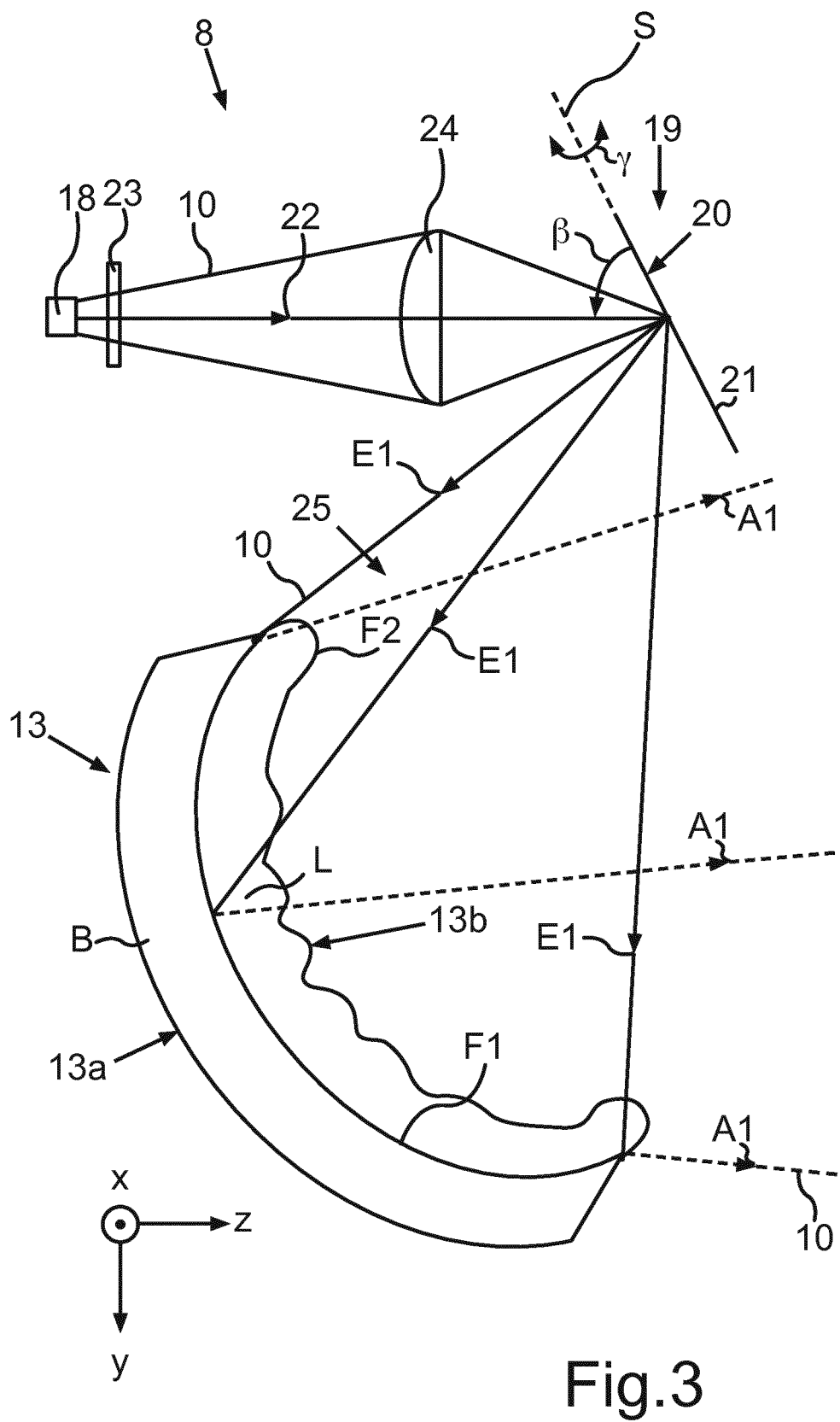
FIG. 3 shows a schematic illustration of an emitting unit of an optical acquisition device having an optical element according to one exemplary embodiment of the invention.

FIG. 3 shows a schematic illustration of an emitting unit 8 for an optical acquisition device 3 according to one exemplary embodiment of the invention. The emitting unit comprises a light source 18 for providing a light beam bundle 10. The light source 18 can comprise one or more laser diodes or other light sources in this case, and can be embodied, for example, as a laser diode array. Furthermore, the light source 18 can be operated in a pulsed manner, so that a light pulse in the form of a beam bundle 10 is provided in a respective time step t1, t2, t3. The light source 18 is preferably designed to emit monochromatic light bundles 10. The wavelength of these monochromatic light bundles 10 can be in any arbitrary wavelength range, preferably in the visible wavelength range and/or in the infrared range and/or ultraviolet range. For example, the light source 18 can be designed to emit light having a wavelength of 905 nm.

Furthermore, the emitting unit 8 comprises a deflection unit 19, which comprises a mirror 20. The mirror 20 preferably represents a MEMS mirror. Furthermore, the mirror 20 preferably comprises a planar mirror surface 21. The incident beam bundle 10 can be deflected in various directions E1, E2, E3 by means of the mirror 20. To be able to provide the largest possible field of view, the mirror 20 or its planar mirror surface 21 is inclined by a fixed angle β in relation to the main incidence direction 22 of the incident light beam bundle 10. In this example, the mirror 20 is rotated by an axis extending parallel to the x axis of the coordinate system shown.

To provide the different incidence directions E1, E2, E3 for the incidence of the beam bundle 10 on the optical element 13, the mirror 20 is furthermore pivotable around a second pivot axis S, which extends perpendicular to the x axis and is in the mirror plane in this example, by various predetermined angles γ. Each present angle γ set at a respective time step t1, t2, t3 therefore provides a predetermined incidence direction E1, E2, E3, at which the light beam bundle 10 is deflected onto the optical element 13.

Furthermore, in order to scan the surroundings 4 by means of this emitting unit 8, it is preferable not to emit individual scanning points, but rather scanning lines, which preferably all extend in the vertical direction with respect to the intended installation location of the optical acquisition device 3 on the motor vehicle 1. To provide such scanning lines, the light beam bundle 10 can be widened in one direction and/or narrowed in a direction perpendicular thereto. For this purpose, a FAC lens 23, which narrows the beam width of the emitted light bundle 10 in one direction, in this case the x direction, can be arranged, for example, in the beam path between the light source 18 and the deflection unit 19. Furthermore, a collimator lens 24 of the FAC lens 23 can also be connected downstream in the beam path to collimate the light bundle 10, in particular again preferably only in the x direction, and to focus the beam bundle in the y-z plane onto the mirror 20. A beam bundle 10 results therefrom, which extends after reflection on the mirror 20 over an incidence range 25. The light beams extending in this incidence range 25 in the first direction E1 are all located in one plane in this case. In this example, the light beam bundle 10 is shown in a zero position of the mirror 20, i.e., for γ equals 0°. A side view of the light beam bundle 10 in the first incidence direction E1 is thus shown in FIG. 3, which can be seen in a top view in FIG. 2. For different deflection angles γ, widening incidence ranges 21 thus result in a chronological sequence, which each differ in an angle δ, which is illustrated by way of example in FIG. 2 for the first incidence direction E1 and the second incidence direction E2.

By way of this beam bundle 10 widened in the y direction shown in FIG. 3, a scanning line may be provided which comprises an aperture angle of, for example, 26° in the y direction, i.e., for example, in the vertical, while the aperture angle perpendicular thereto, i.e., in the x direction shown here, of such an emitted light beam bundle 10 only measures, for example, 0.1°. Such a smaller aperture angle in the x direction, in particular for all incidence directions E1, E2, E3 and the corresponding emission directions A1, A2, A3, may only be achieved by the optical element 13, however. This will be explained in greater detail by FIG. 4a to FIG. 4c.

Figure 4A:
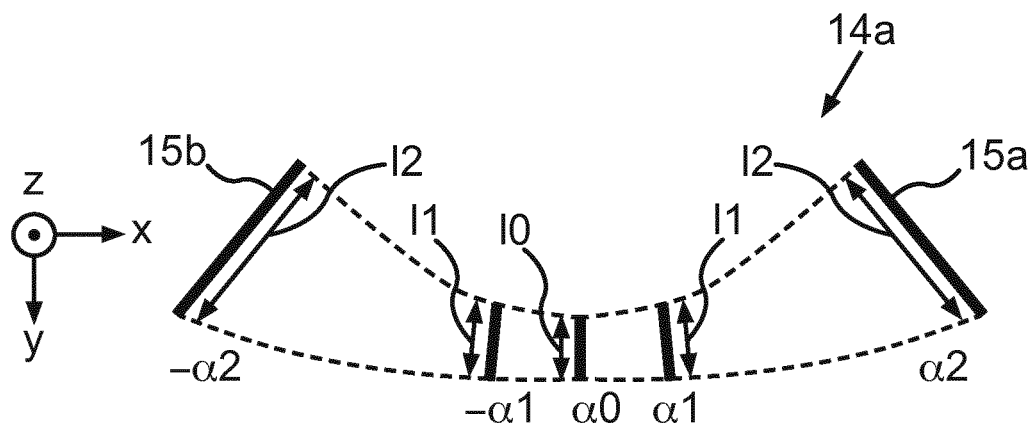
FIG. 4a shows a schematic illustration of a first scanning light distribution generated by a laser scanner according to the prior art.

FIG. 4a shows a schematic illustration of a first light distribution 14a, as would be emitted by an emitting unit according to the prior art without the optical element 13. The specified angles α0, α1, and α2 in this case denote the deflection angles, at which the light beam bundle emitted by an emitting unit is emitted. In particular, such a light distribution 14a would arise over multiple time steps t1, t2, t3 observed in a plane of section, for example, perpendicular to the emission direction at an emission angle α of 0°, which is identified here by α0, using an arrangement according to FIG. 3 without the optical element 13, but rather, for example, instead only having a planar deflection mirror. The field of view extends accordingly over an angle range from −α2 to +α2 with respect to the x-z plane, for example, the horizontal. α1 is, for example, 30° and α2 is, for example, 75°. Due to the fixed angle β, which the mirror 20 has in relation to the main incidence direction 22 of the incident light beam bundle 10, without the optical element 13, an emitted light distribution 14a results, according to which the individual scanning lines comprise a respective length l0, l1, l2 in a respective direction, which do not extend parallel to one another, but are inclined more or less in relation to the vertical. The greater the deflection angle α is in this case, the more strongly the scanning lines are inclined in the corresponding longitudinal extension thereof in relation to the vertical or the y direction shown here, respectively. By way of example, only the scanning lines 15a and 15b delimiting the field of view are provided with a reference sign. Accordingly, the field of view is thus delimited at least in one direction, the x direction here, by two straight lines which do not extend parallel to one another. This distortion or deformation of the field of view results in an effective reduction of the actually usable field of view of an optical acquisition device, and is therefore undesirable. An equalization of this field of view may advantageously be effectuated by the optical element 13.

This light distribution shown in FIG. 4a also corresponds in its forming in this case to the light distribution incident from the mirror 20 on the optical element 13 in successive time steps according to the emitting unit from FIG. 3, which can now advantageously be equalized by the optical element and thus this banana effect can be compensated for.

Figure 4B:
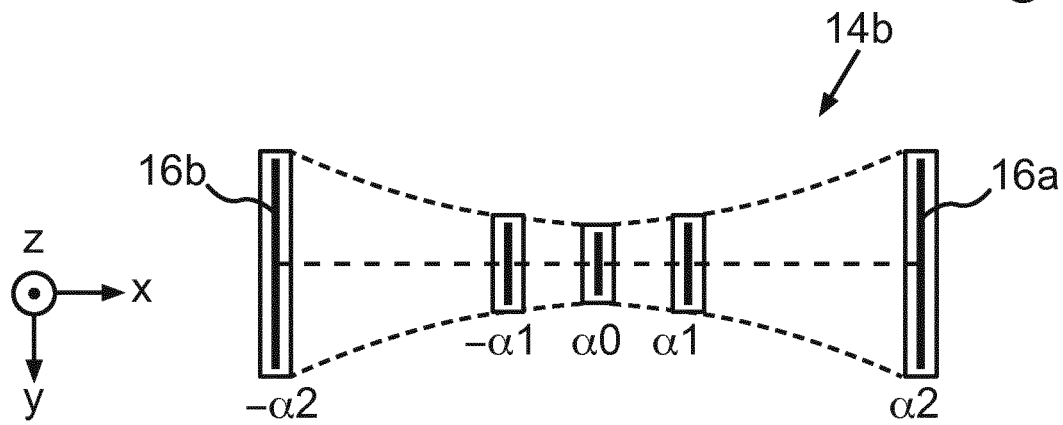
FIG. 4b shows a schematic illustration of a second scanning light distribution generated by a laser scanner without compensation of the beam divergence.

FIG. 4b shows a schematic illustration of a field of view 14b, as would result if only one free-form mirror were located instead of the optical element 13, as shown in FIG. 3. The scanning elements 16a, 16b delimiting the field of view extend in this case as straight lines parallel to one another, and in particular also parallel to all other scanning lines located in between. The equalization of the field of view by only one free-form mirror disadvantageously causes a significant divergence of the respective beam bundle, however, which is noticeable above all in significant widening of the respective scanning lines in the x direction. Moreover, such widening is all the more strongly pronounced the larger the scanning angles and/or emission angles α are.

Figure 4C:
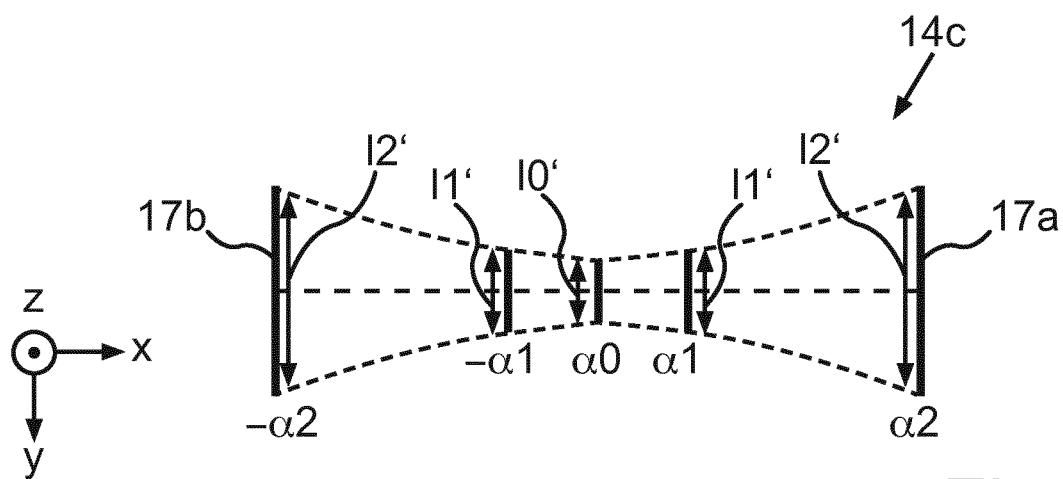
FIG. 4c shows a schematic illustration of a third scanning light distribution generated by a laser scanner having an optical element according to one exemplary embodiment of the invention.

By way of the optical element 13 according to the invention and its embodiments, advantageously both the banana effect shown in FIG. 4a may be completely compensated for and a divergence of the individual beam bundles may be reduced to a minimum at the same time. This is shown in FIG. 4c. In particular, FIG. 4c shows in this case a schematic illustration of a third light distribution, as results, for example, due to an embodiment of the emitting unit 8 as shown in FIG. 3. The respective scanning lines extend parallel to one another with respect to the respective lengths 10', 11', 12' thereof, having significantly reduced width perpendicular to the lengths 10', 11', 12' thereof, in particular in contrast to light distribution 14b from FIG. 4b. The field of view is again delimited in the x direction by two parallel scanning lines 17a, 17b, which can be described by straight lines extending parallel to one another.

Furthermore, respective incidence directions E1, E2, E3 and respective emission directions A1, A2, A3 associated therewith can be assigned to individual surface regions of the second free-form surface F2 and in particular also the first free-form surface F1, in particular in such a way that the surface regions of the respective free-form surface F1, F2 associated with the respective incidence directions E1, E2, E3 do not overlap for different incidence directions E1, E2, E3. The respective emission regions of the second free-form surface F2 for different emission directions A1, A2, A3 preferably also do not overlap, and in particular also do not overlap with the incidence regions. It is thus advantageously possible in a particularly simple manner to optimize the respective incidence and emission regions of the second free-form surface and the respective reflection regions of the first free-form surface advantageously to the respective effect to be achieved for the respective emission angle with respect to the compensation of the banana effect and the compensation of the divergence. The embodiments and formations required for this purpose of the respective free-form surface F1 and F2 can thus be computed in a simple manner on the basis of the law of reflection and the law of refraction and thus provided.

Figure 5:
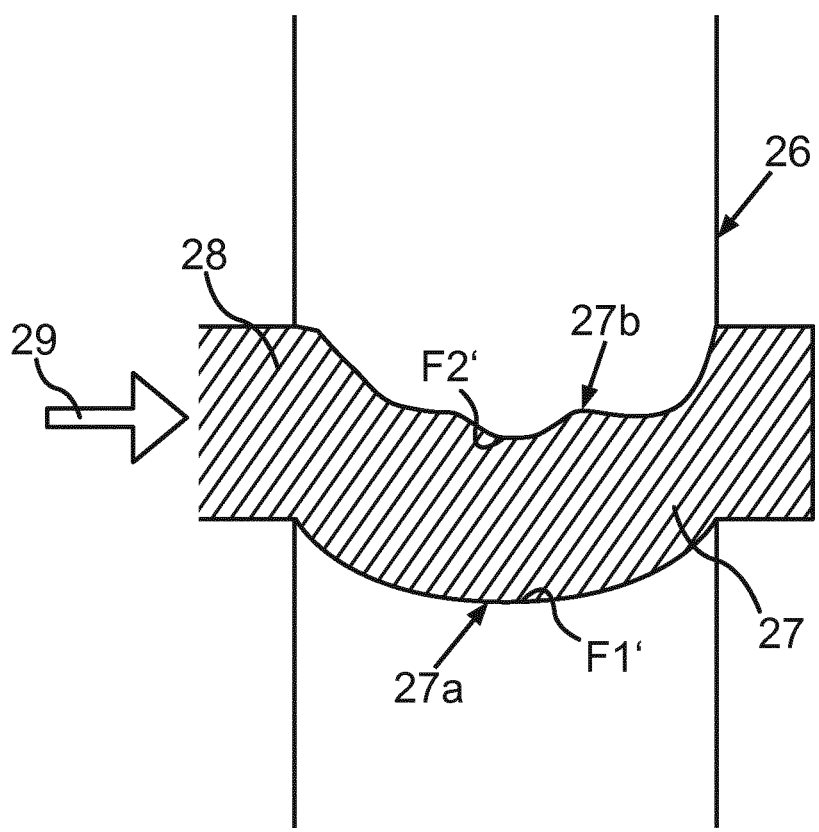
FIG. 5 shows a schematic illustration of a method for producing a free-form lens for an optical element according to one exemplary embodiment of the invention.

FIG. 5 shows a schematic illustration to illustrate an injection-moulding method for producing a free-form lens L for an optical element 13. An injection mould 26 is provided for this purpose, which comprises a cavity 27. This cavity 27 in turn comprises a first side 27a having a first predetermined free-form surface F1', which corresponds to the first free-form surface F1 of the optical element 13, and a second side 27b having a second predetermined free-form surface F2', which corresponds to the second free-form surface F2 of the optical element 13. To produce the optical element 13, a material 28 in molten form is poured into the cavity 27 of the injection mould 26, which is illustrated by the arrow 29. Subsequently, the material 27 is transferred into the solid state. Such a transfer can be effectuated, for example, by curing or cooling of the material 27. The solid material 27 thus forms a free-form lens L having the desired free-form surfaces F1, F2. After removal of the free-form lens L from the injection mould 26, the first side 13a, which was formed having the first free-form surface F1' of the cavity 27, is coated using a reflective or mirrored coating B to provide the mirrored first free-form surface F1 of the optical element 13.

The invention claimed is:

1. An optical element for an emitting unit of an optical acquisition device, the optical element comprising:
   a first side having a reflective first free-form surface; and
   a second side, which is opposite to the first side, having a refractive second free-form surface,
   wherein the optical element is configured to:
      transmit a beam bundle incident on the second side on the optical element at least in large part through the second free-form surface up to the first free-form surface,
      reflect the beam bundle transmitted through the second free-form surface up to the first free-form surface at the first free-form surface, and
      emit the beam bundle reflected from the first free-form surface via the second free-form surface,
   wherein the first free-form surface is configured to increase a divergence of the beam bundle incident on the first free-form surface, and the second free-form surface is configured to reduce the divergence increased during the reflection upon emission of the beam bundle reflected from the first free-form surface,
   wherein the optical element is a free-form lens having a reflective coating on one side of the free-form lens to provide the first reflective free-form surface of the optical element, and
   wherein the reflective coating comprises a metallic material selected from the group consisting of: gold, silver, aluminium, and copper.

2. The optical element according to claim 1, wherein the optical element is configured to image a first light distribution that is incident over multiple time steps on the second free-form surface of the optical element in at least one incidence direction,
   the first light distribution is incident in its entirety over the multiple time steps, and in a first plane perpendicular to the at least one incidence direction on the optical element,
   the first light distribution is delimited by two nonparallel first straight lines,
   the optical element images the first light distribution on an emitted light distribution providing a field of view emitted from the optical element, and
   the emitted light distribution is delimited in a second plane perpendicular to at least one determined emission direction by two parallel second straight lines.

3. The optical element according to claim 1, wherein the optical element is configured, upon emission of the beam bundle reflected from the first free-form surface, to reduce the divergence of the beam bundle increased during the reflection in such a manner that the emitted beam bundle has a divergence less than 0.2°.

4. The optical element according to claim 1, wherein the free-form lens comprises a glass and/or a plastic.

5. An emitting unit for an optical acquisition device of a motor vehicle, the emitting unit comprising an optical element according to claim 1.

6. The emitting unit according to claim 1, wherein the emitting unit comprises a light source for providing at least one beam bundle and a deflection unit configured to deflect the at least one beam bundle in successive time steps in different predetermined incidence directions and radiate the at least one beam bundle onto the second free-form surface of the optical element, wherein a respective incidence direction corresponds to a respective emission direction, in which the beam bundle incident on the second free-form surface of the optical element is emitted from the second free-form surface of the optical element after reflection at the first free-form surface of the optical element.

7. The emitting unit according to claim 5, wherein the deflection unit comprises a mirror having a mirror plane, wherein the emitting unit is configured so that the at least one beam bundle provided by a light source is incident on the mirror plane in a main incidence direction, wherein the mirror is arranged in such a manner that the mirror plane is inclined in relation to the main incidence direction by a fixed first angle around a first axis perpendicular to the main incidence direction and is pivotable by various predetermined second angles around a second axis perpendicular to the first axis, wherein the first and the second axis extend in the mirror plane.

8. The emitting unit according to claim 7, wherein an incidence direction range is associated with a respective second angle, wherein the incidence directions of a first of the incidence direction ranges differ from the incidence directions of a second of the incidence direction ranges, which is different from the first, in a third angle, which is twice as large as the difference between the second angles associated with the first and second incidence direction ranges.

9. The emitting unit according to claim 7, wherein the emitting unit is configured in such a manner that the optical element is irradiated for a respective set second angle of the mirror using a light distribution, which has a maximum extension in a respective first direction which defines a length which is multiple times greater than a width of the light distribution perpendicular to the length.

10. The emitting unit according to claim 9, wherein the respective first directions for a respective set second angle enclose a fourth angle with one another which is not equal to zero.

11. The emitting unit according to claim 7, wherein
the optical element images a first light distribution incident on the optical element for a respective set second angle of the mirror
the optical element images the first light distribution on an emitted light distribution that is respective to the first light distribution,
the respective emitted light distribution has a maximum extension in a respective second direction which defines a length of the respective emitted light distribution,
the length is multiple times greater than a width of the respective emitted light distribution that is perpendicular to the length, and
the second directions are each parallel to one another.

12. A motor vehicle comprising an optical acquisition device having an emitting unit according to claim 1.

13. A method for producing an optical element according to claim 1, the method comprising:
pouring a molten material into an injection mould comprising a cavity, the cavity comprising a first side having a first predetermined free-form surface, which corresponds to the first free-form surface of the optical element and a second side having a second predetermined free-form surface, which corresponds to the second free-form surface of the optical element,
wherein the first side of the cavity is opposite to the second side of the cavity at least in the state of the injection mould filled with the material;
transferring the molten material into solid state, wherein the material is transparent at least in the solid state;
coating the molten material, which is removed from the injection mould and forms a free-form lens, on a predetermined free-form surface of the material formed by the first side of the cavity, using a reflective coating.

* * * * *

UNITED STATES PATENT AND TRADEMARK OFFICE
CERTIFICATE OF CORRECTION

PATENT NO. : 10,859,706 B2  
APPLICATION NO. : 16/489102  
DATED : December 8, 2020  
INVENTOR(S) : Ho Hoai Duc Nguyen et al.

Page 1 of 1

It is certified that error appears in the above-identified patent and that said Letters Patent is hereby corrected as shown below:

In the Claims

Claim 6, Column 15, Line 4, the words "according to claim 1" should read -- according to claim 5 --.

Claim 11, Column 16, Line 9, the word "mirror" should read -- mirror, --.

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*